United States Patent [19]
Merkel et al.

[11] Patent Number: 5,970,569
[45] Date of Patent: Oct. 26, 1999

[54] WIPER BLADE FOR WINDSHIELDS OF MOTOR VEHICLES

[75] Inventors: Wilfried Merkel, Kappelrodeck; Thomas Kotlarski, Buehlertal, both of Germany

[73] Assignee: Robert Bosch GmbH, Stuttgart, Germany

[21] Appl. No.: 08/973,408

[22] PCT Filed: May 10, 1997

[86] PCT No.: PCT/DE97/00949

§ 371 Date: Dec. 1, 1997

§ 102(e) Date: Dec. 1, 1997

[87] PCT Pub. No.: WO98/01327

PCT Pub. Date: Jan. 15, 1998

[30] Foreign Application Priority Data

Jul. 5, 1996 [DE] Germany .......................... 296 11 721

[51] Int. Cl.⁶ .................................................. B60S 1/38
[52] U.S. Cl. ................................ 15/250.43; 15/250.32; 15/250.451
[58] Field of Search ...................... 15/250.451, 250.452, 15/250.453, 250.32, 250.43, 250.361

[56] References Cited

U.S. PATENT DOCUMENTS

| | | | |
|---|---|---|---|
| 3,035,298 | 5/1962 | Scinta | 15/250.452 |
| 3,094,734 | 6/1963 | Hoyle | 15/250.451 |
| 3,350,738 | 11/1967 | Anderson | 15/250.451 |
| 3,427,637 | 2/1969 | Quinlan et al. | 15/250.451 |
| 3,659,310 | 5/1972 | Rosen | 15/250.452 |
| 3,696,497 | 10/1972 | Quinlan et al. | 15/250.451 |
| 3,881,213 | 5/1975 | Tilli | 15/250.43 |
| 3,995,347 | 12/1976 | Kohler | 15/250.43 |
| 4,028,770 | 6/1977 | Appel | 15/250.43 |
| 4,336,625 | 6/1982 | Maiocco | 15/250.451 |
| 4,337,547 | 7/1982 | Hancou | 15/250.32 |

FOREIGN PATENT DOCUMENTS

| | | | |
|---|---|---|---|
| 489178 | 12/1952 | Canada | 15/250.451 |
| 26 14 457 | 10/1976 | Germany . | |
| 862036 | 3/1961 | United Kingdom | 15/250.451 |

*Primary Examiner*—Gary K. Graham
*Attorney, Agent, or Firm*—Michael J. Striker

[57] ABSTRACT

A wiper blade is proposed which is used for cleaning windshields of motor vehicles. The wiper blade has an elastic, elongated support element for an elongated wiper strip, made of flexible material, placed against the windshield to be wiped, which has on its longitudinal sides longitudinal grooves facing each other, in which runners, which are arranged at a distance from each other, of the support element are positioned, whose center section has a connecting device for a powered wiper arm, and wherein the cross section of the two longitudinal runners diminishes from their center area toward the end of the runners, wherein the two adjoining ends of the longitudinal runners are each connected in a single piece by means of a cross brace. A particularly process-oriented and assembly-friendly wiper blade results, if the longitudinal runners of the support element have an even thickness over their entire longitudinal extension and the width of the support element from its center area is reduced toward its two ends.

7 Claims, 2 Drawing Sheets

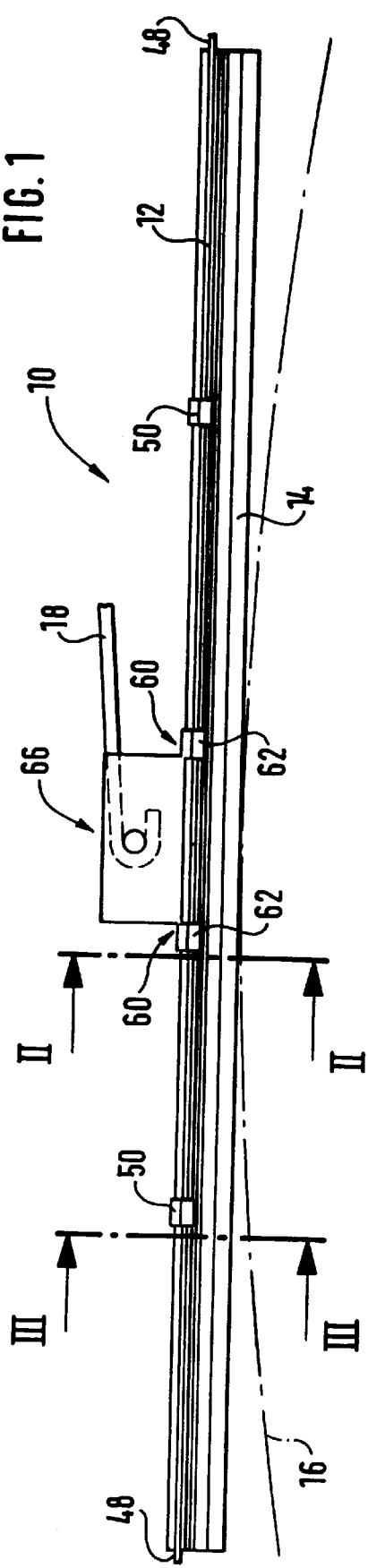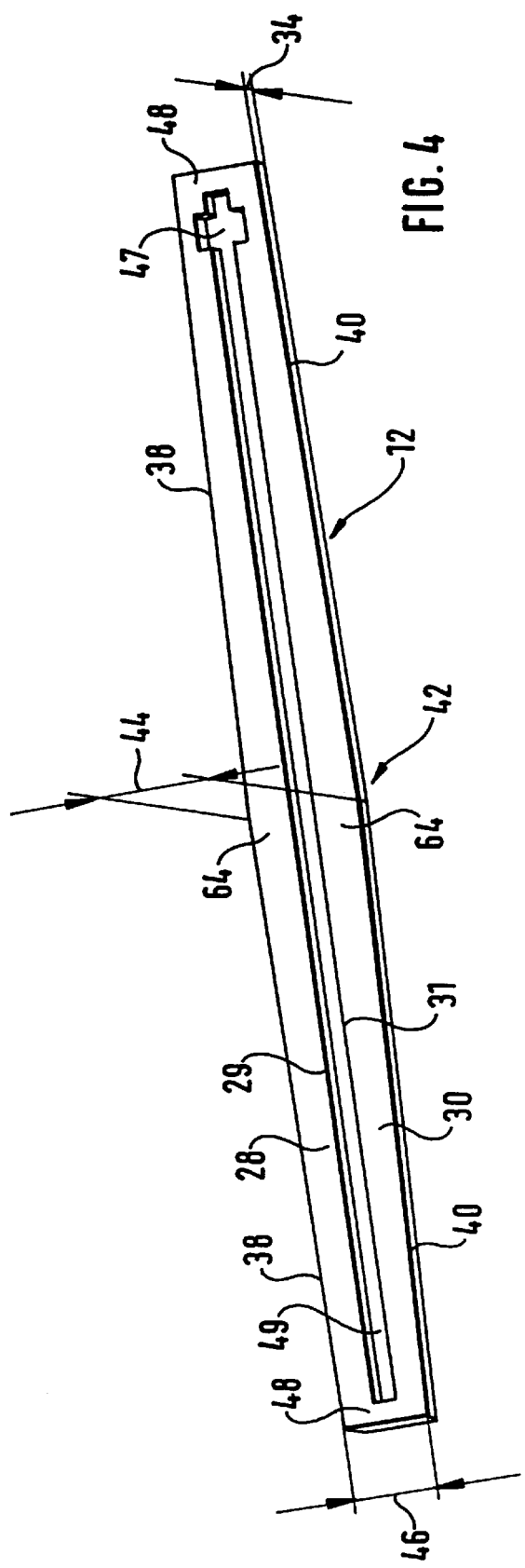

WIPER BLADE FOR WINDSHIELDS OF MOTOR VEHICLES

BACKGROUND OF THE INVENTION

The invention relates to a wiper blade. In a known wiper blade of this species (DE 26 14 457 A1) distribution, as even as possible, of the wiper blade contact pressure on the windshield surface to be wiped is intended to be achieved by means of varying thickness of the support elements, wherein the center section of the support element is thicker and thus more rigid than the thinner and thus more flexible end section of the support element. Such a support element embodiment at best may be somewhat economically feasible when the support element is made of plastic, however, even in that case each support element has to be individually pressed or injection-molded in a mold.

SUMMARY OF THE INVENTION

In keeping with these objects and with others which will become apparent hereinafter, one feature of present invention resides, briefly stated, in a wiper blade in which the longitudinal runners of a support element have an even thickness over their entire longitudinal width, the width of the support element is reduced from its center in the direction of its two ends and the connecting device for a power wiper arm is directly connected to the longitudinal runners.

When the longitudinal runners of the support element or respectively the entire support element are of the same thickness over their entire longitudinal extension, these—and thus the entire support element—can be extruded particularly cost-effectively if these components are to be made of plastic. Reducing the width of the support element is possible in a simple manner by cutting the outer longitudinal side edges accordingly. Another advantage results in that the support element can also be cut from appropriately dimensioned spring steel.

In case the longitudinal extension of the support element exceeds a certain value, causing a certain weakness of the longitudinal runners or respectively of the support element, the necessary stability of the support element can be assured, in that between the two cross braces of the support element arranged at the ends of the longitudinal runners, stabilizing devices acting on the two longitudinal runners are disposed.

Depending on the choice of material for the clips, it may be practical if these are connected frictionally or interlockingly with the longitudinal runners. A frictional and interlocking connection is of course also possible.

The stabilizing devices embodied as clips are suitably fitted with claw attachments, which pass around the longitudinal edges facing away from each other of the longitudinal runners of the support elements.

An additional simplification of the wiper blade results, if in a further embodiment of the invention at least one stabilizing clip is fitted with a connecting device for the powered wiper arm.

If the support element is made of spring steel, a particularly low constructed wiper blade can be achieved, which has good properties regarding the flow conditions present in front of the windshield of the inflowing air.

BRIEF DESCRIPTION OF THE DRAWINGS

Shown are in FIG. 1 a lateral view of a wiper blade in accordance with the invention, in FIG. 2 a section of the wiper blade along the line II—II, with a center section of the wiper blade shown in enlarged perspective, in FIG. 3 the cut section through the wiper blade along the line III—III in FIG. 1, and in FIG. 4 a perspective representation, not to scale, of a support element as a part of the wiper blade.

DESCRIPTION OF THE PREFERRED EMBODIMENT

Figure 2:
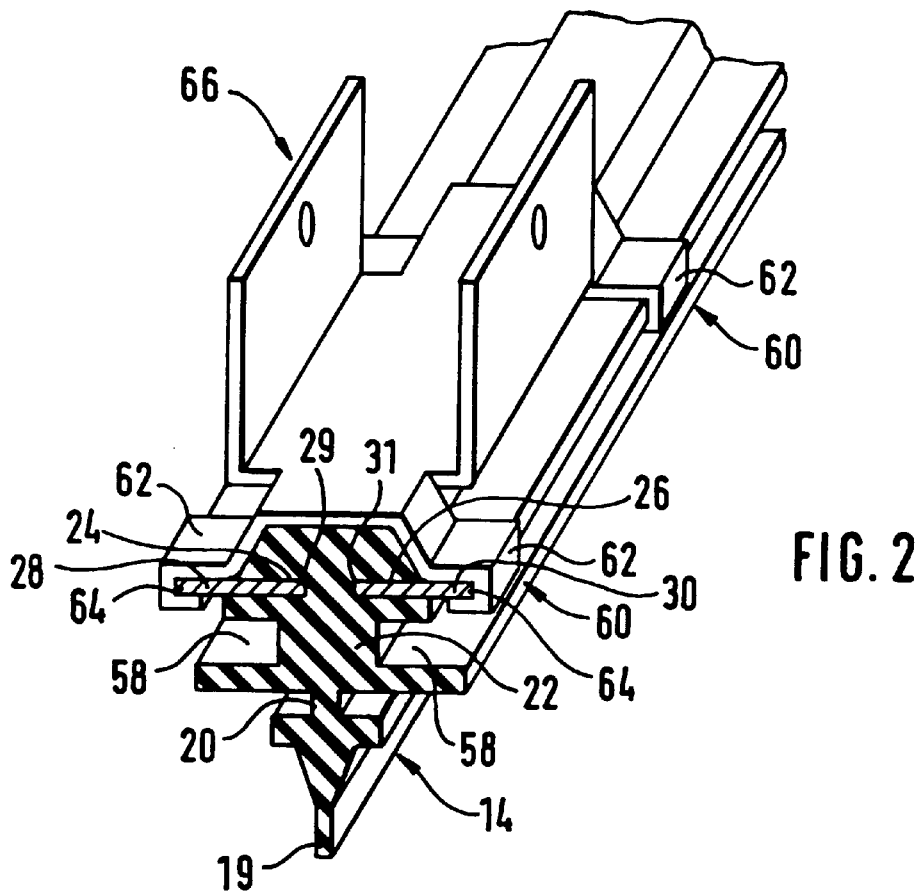

A wiper blade 10 represented in FIG. 1 has an elastic support element 12 (FIG. 4), made of spring steel in the exemplary embodiment, for a wiper strip 14 made of rubber-like material. For simplification the elongated wiper blade 10 in FIG. 1 is drawn in a position in which it would hardly be in actuality, because the elastic support element is pre-loaded in such a way, that the wiper strip 14 is curved in a manner indicated by way of a dash-dotted line 16 in FIG. 1. The degree of this curvature is higher than the maximal curvature of the windshield to be wiped, which as a rule is spherically curved; i.e., contact of the wiper blade 10 with the windshield to be wiped is first made with its two end sections, until finally, under contact pressure of a wiper arm 18 loaded toward the windshield, its center area also comes into contact with the windshield 16. The aforementioned curvature of the support element 12 and thus of the wiper blade 10, after careful balance, is intended to achieve as even as possible a distribution of the contact pressure against the windshield coming from the powered wiper arm 18.

Figure 3:
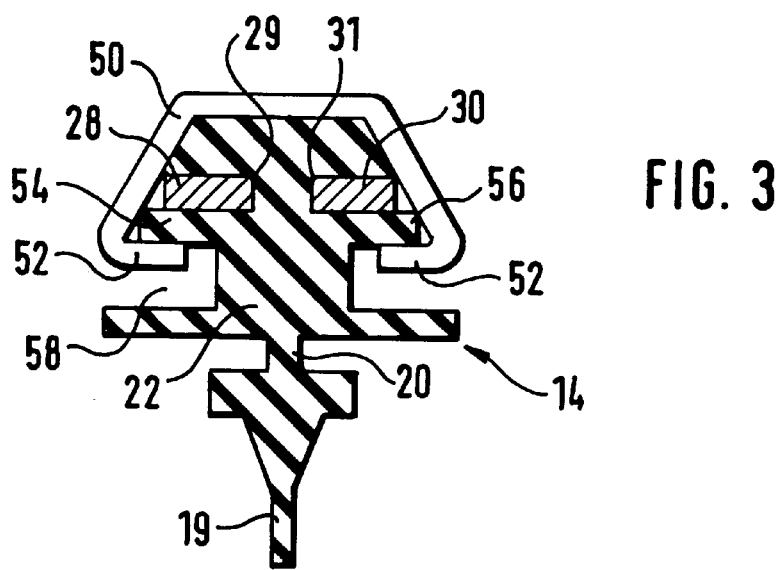

The general structure of the wiper blade will be now explained by means of FIGS. 1 to 3. The wiper strip 14, which has a constant cross section over its entire length, has a wiper lip 19 resting against the windshield, which is connected with the body 22 of the wiper strip 14 by means of a so-called tilting bar 20. Inside the two longitudinal sides of the wiper strip body 22 facing each other, longitudinal grooves 24 and 26 facing each other are disposed, which extend over the entire length of the extended wiper strip 14. Longitudinal runners 28 and 30 of the support element 12 are housed in the longitudinal grooves 24 and 26, whose design can be seen in FIG. 4. In the exemplary embodiment the support element 12 is made of spring steel. It has an even thickness 34 over its entire length. The two longitudinal runners 28 and 30 of the support element are disposed in the longitudinal grooves 24 and 26 of the wiper strip 14 in such a way, that their extended inner edges 29, 31, facing each other in FIG. 4, face the base of their longitudinal grooves 24 or respectively 26 (FIG. 2), and that the outer edges 38 or respectively 40, which approach the inner edges 29, 30 from the center section 42 of each longitudinal runner 28 or respectively 30 face away from each other. The embodiment of the support element 12 is thus made in such a way, that its width 44 is greater at its center section 42 than its width 46 in the area of the ends of the longitudinal runners 28 and 30. Thus a reduction of the cross section of the two longitudinal runners, and therefore of the cross section of the support element beginning at the center section 42 toward the end of the runners results. The two adjoining ends of the longitudinal runners 28, 30 are connected with each other in one piece by means of cross braces 48. The support element 12 thus is strip-shaped and is provided with a slit-shaped opening 49.

If the length of the wiper blade 10 and thus also the length of the support element 12 exceeds a certain value, it may be expedient for purposes of stabilizing the support elements 12, to place intermediate clips between the ends of the longitudinal runners 28 and 30, which are indicated in FIGS. 1 and 3 by the reference numeral 50. These clips 50, embodied as separate components, envelope a part of the wiper strip body 22 and with their claw attachments 52 extend under the longitudinal runners 28 and 30 positioned in the longitudinal grooves 24 and 26. Since these longitudinal runners no longer protrude at their ends out of the longitudinal runners 24 and 26 because of the reduced width 44, 46 of the support element, the claw attachments 52 do not extend directly under the longitudinal runners, but extend below the lower walls 54 and 56 of the longitudinal grooves 24 and 26, which are formed by means of a constriction 58 of the wiper strip body 22 (FIG. 3). By pressing together the clips 50 in a specific direction, a certain shaping of the wiper strip body can be achieved, in this way securing the support element 12 to the wiper strip and securing the clips 50, which are a part of the support element 12, to the wiper strip. However, a form-fitting securing of the clips 50 to the longitudinal runners 28 and 30 and/or to the wiper strip 14 is also conceivable. The clips 50 stabilize the longitudinal runners 28, 30 or respectively the support element 12.

Another advantageous embodiment of the intermediate clips can be seen in FIGS. 1 and 2. In this case the two intermediate clips 60 are combined into a single component, since they are connected with each other with a connecting device 66, with the aid of which the wiper blade 10 can be releasably connected to the powered wiper arm 18 in a manner known per se. However, since the clips 60 are disposed in the center section 42 of the support element 12 (FIG. 1), into which the longitudinal edges 38 and 40 of the longitudinal runners, facing away from each other, extend from the longitudinal grooves 24, 26, the claw attachments 62 of these intermediate clips 60 can directly enclose the longitudinal strips 64 of the longitudinal runners 28, 30 protruding from the longitudinal grooves. Securing the intermediate clips 60 to the wiper strip takes places in the same manner as described for the aforementioned clips 50.

It is evident, that the change of the cross section of the two longitudinal runners 28, 30 or respectively of the support elements 12, starting at its center section 42, must be adapted to the respective circumstances, so that proper distribution of the contact pressure over the entire wiper blade length is achieved.

The assembly of the support element 12 to the wiper strip 14 takes place in such a way, in that its body 22 is slipped into the opening 49 over a partial widening 47 in such a way, that the assembly position shown in FIGS. 1 and 3 is reached, wherein the inner edges 29, 31 of the longitudinal runners 28 and 30 enter into their longitudinal grooves 24, 26 in the wiper strip body 22.

As the case may be, the clips 50 and/or 60 are afterwards attached and secured.

We claim:

1. A wiper blade for windshields of motor vehicles, driveable by a powered wiper arm, the wiper blade comprising: an elongated wiper strip composed of a flexible material and including a body with an upper surface thereon and a lip tiltably connected to said body for placement against a windshield to be wiped, said body having on longitudinal sides thereof, longitudinal grooves facing each other; an elastic elongated support element provided for said elongated wiper strip and having a pair of longitudinal runners which are spaced at a distance from each other and inserted in said longitudinal grooves, said support element being preloaded to define a continuous curve between opposing ends thereof, said support element having a center section with a connecting device attached thereto for coupling with said powered wiper arm, each said longitudinal runner having a transverse cross-section which beginning at its center diminishes in width toward each end of said runner, said longitudinal runners, at said ends, are each connected into one single piece by a cross brace, said longitudinal runners have an even thickness over their entire longitudinal length, said support element having an overall width which is reduced from its center in a direction of its two end, said connecting device for said powered wiper arm being directly connected with said longitudinal runners and comprising an elongated planar bottom wall having opposing ends, said connecting device being shorter in longitudinal length than said support element, each said end of the bottom wall includes a pair of claw attachments, each receiving a runner therein, said planar bottom wall lies against said wiper strip upper surface along the entire length of said bottom wall.

2. A wiper blade as defined in claim 1, and further comprising stabilizing devices which are connected with and act on said longitudinal runners and are located between said two cross-braces of said support element.

3. A wiper blade as defined in claim 2, wherein each stabilizing device is formed as a clip and is frictionally connected with said longitudinal runners of said support element.

4. A wiper blade as defined in claim 3, wherein each said clip extends around longitudinal edges of said longitudinal runners of said support element facing away from each other with claw attachments.

5. A wiper blade as defined in claim 2, wherein each stabilizing device is formed as a clip and is interlockingly connected with said longitudinal runners of said support element.

6. A wiper blade as defined in claim 5, wherein each said clip extends around longitudinal edges of said longitudinal runners of said support element facing away from each other with claw attachments.

7. A wiper blade as defined in claim 1, wherein said support element is composed of spring steel.

\* \* \* \* \*